May 9, 1933. W. S. FISHER 1,908,639
ENGINE MOUNTING
Filed May 8, 1930
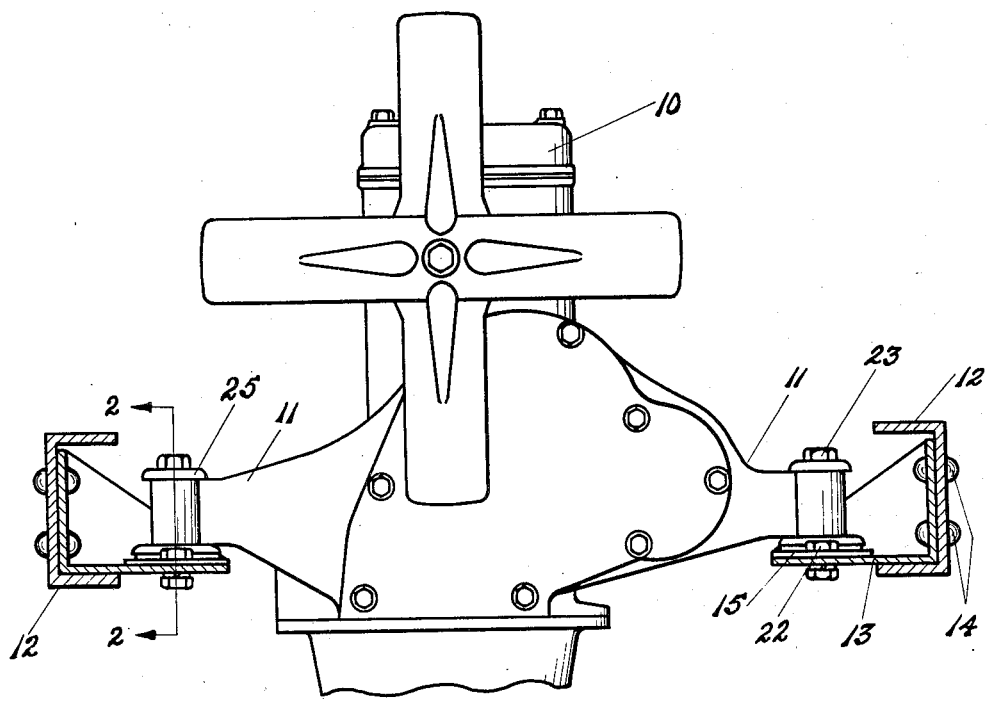
Fig. I.
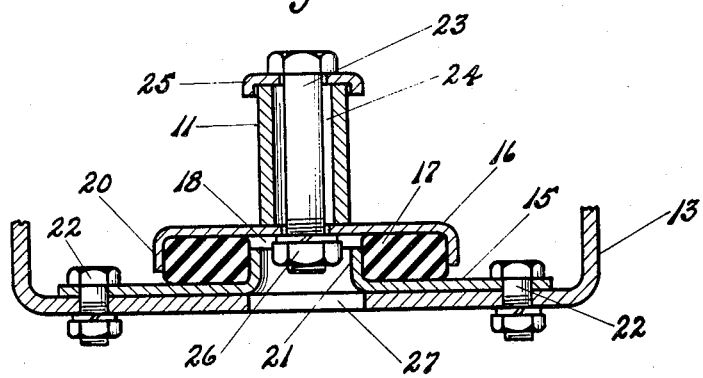
Fig. 2.
INVENTOR.
WALTER S. FISHER.
BY Warren T. Hunt
ATTORNEY.

Patented May 9, 1933

1,908,639

UNITED STATES PATENT OFFICE

WALTER S. FISHER, OF TOLEDO, OHIO, ASSIGNOR TO THE WILLYS-OVERLAND COMPANY

ENGINE MOUNTING

Application filed May 8, 1930. Serial No. 450,719.

My invention relates to engine supports and more particularly to supports for securing an internal combustion engine in the frame of a motor vehicle.

The main object of this invention is to provide a support which will reduce side sway of the engine.

Another object of the invention is to provide an inexpensive resilient engine mounting, which will facilitate assembly and readily permit removal and replacement of the engine.

Further objects of the invention will appear from a consideration of the following description of one embodiment of the invention, which is illustrated in the accompanying drawing, forming a part of this specification, in which:

Figure 1 is a vertical end view, partly in section, of an engine mounted in a vehicle frame.

Fig. 2 is a vertical section taken on line 2—2 of Figure 1.

Referring to the drawing, I have shown an internal combustion engine 10 provided with supporting arms 11, a frame 12 having brackets 13 secured to the frame by rivets 14 and a resilient supporting unit, comprising two opposing plates 15 and 16 and a rubber insert 17 mounted between the plates, having an axial opening 18 therein. The top face of the insert 17 is bonded to the plate 16 having a flange 20 extending around the outer edge of the rubber insert 17. The bottom face of the insert 17 is bonded to the plate 15 having a flange 21 extending into the inner opening 18. The bottom edge of the flange 20 and the top edge of the flange 21 extend into overlapping spaced relation with each other in a horizontal plane as may be seen in Fig. 2. By such a construction the weight of the engine normally holds the rubber insert under compression, and lateral forces are opposed by the compressed resistance of the insert. The plate 15 is secured to the supporting member 13 by bolts 22, and the plate 16 is secured to the engine arm 11 by a bolt 23. The bolt 23 is inserted through an opening 24 in the supporting arm 11, engaging a washer 25 interposed between the arm and bolthead. The nut 26 is inserted through an opening 27 in the supporting member 13, which engages the lower surface of the plate 16, and secures the engine arm to the resilient support.

When the engine is to be mounted in the frame it is only necessary to swing it into the proper position in the frame and secure it by the bolts 23 and nuts 26. Should it become necessary to remove the engine, this may be done by simply removing the bolt 23 without disturbing the resilient mountings.

While I have illustrated and described one embodiment of my invention in detail, it is to be understood that this showing and description are illustrative only, and that I do not regard the invention as limited to the details of the construction illustrated and described, except insofar as I have included such limitations within the terms of the following claim.

I claim:

In an engine mounting for securing an engine having a projecting arm in a frame, said arm being of sheet material and having its extremity formed into a cylindrical portion; a frame bracket; a resilient unit positioned between said arm and said frame bracket, said unit comprising a pair of sheet metal plates and an annular element of resilient material interposed between said plates and bonded thereto, said plates having flanges respectively engaging the inner and outer peripheries of the resilient element, said flanges extending substantially throughout the length of the resilient element forming an enclosing casing therefor, and a bolt passing through the cylindrical portion of said engine arm and one of said plates for retaining the resilient unit between the engine arm and the frame bracket.

In testimony whereof, I affix my signature.

WALTER S. FISHER.